United States Patent Office 3,211,653
Patented Oct. 12, 1965

3,211,653
HYPOID GEAR LUBRICANTS FOR SLIP-LOCK DIFFERENTIALS
Rosemary O'Halloran, Union, N.J., assignor to Esso Research and Engineering Company, a corporation of Delaware
No Drawing. Filed Dec. 31, 1958, Ser. No. 784,044
1 Claim. (Cl. 252—50)

This invention relates to the discovery that certain amines or amine derivatives when added to gear lubricants, eliminate or markedly reduce those noises which frequently occur in the clutch plate assembly of the newly introduced slip-lock differentials for automotive vehicles. This invention also relates to the discovery that gear oil blends designed for very severe operating conditions (high speed, high torque or severe shock) may be rendered suitable for use in slip-lock differentials without objectionable noise and without any loss in extreme pressure properties by the addition of minor amounts of an amine and an azomethine. This invention therefore relates to a method for eliminating those noises which frequently occur in conventionally lubricated slip-lock differentials and to the gear lubricating compositions suitable for use in slip-lock differentials that are produced thereby.

There is a wide variety of conventional gear oils entirely satisfactory for lubricating differentials. However, when these conventional gear oils are used to lubricate slip-lock differentials, in many cases a noisy chattering occurs in the clutch plate assembly of the slip-lock differential under certain conditions which occur in normal driving. The slip-lock differential units for automotive rear axles consist of a pack of 3 to 5 discs or plates mounted on each axle which act to retard the movement of the faster running wheel (as when one wheel is slipping on mud or ice) and to direct torque back to the other wheel, i.e., when one wheel begins to slip, the clutch plates upon that axle are engaged to retard the movement of the slipping wheel and thus direct torque to the non-slipping wheel. This enables the car to move in situations where a conventional differential would continue to allow the torque to be transmitted to the slipping wheel. It has been found through testing on numerous cars equipped with these slip-lock differentials that on sharp turns the clutch of the axle of the wheel on the outside arc of the turn will be partially engaged causing chattering and thudding sounds that create a vibration throughout the entire car. This noise and vibration occurs frequently enough in general car operation to be annoying to the driver and disturbing to the automobile manufacturers. Proper lubrication of the slip-lock axles requires a lubricant containing (a) an extreme pressure agent to prevent wear of the highly loaded hypoid gears and (b) a lubricant which will prevent or reduce the noise of the clutch plates when they are engaged and especially when they are partially engaged as when making sharp turns.

It has now been found and this finding forms the basis of the present invention, that certain amines or amine derivatives when added to gear oils completely removes or markedly reduces this objectionable clutch plate chatter. These amine-gear oil blends continue to give entirely satisfactory performance in standard differentials in addition to giving quiet performance in the newly introduced slip-lock differentials. The amine additives of this invention are particularly effective in gear oils compounded from lubricating oils having a visocity of about 50 to 220 SSU at 210° F. and containing extreme pressure additives such as sulfur-chlorine and P–S–Cl containing compounds. However, in gear oils designed for extremely severe operating conditions (high speed, high torque or severe shock) as are gear oils designed for use in military vehicles (i.e., gear oils passing MIL-L-2105 and more severe tests), the amines of this invention have been found to reduce the ability of these gear oils to pass severe gear tests. Thus, as a further facet of this invention it has been found that addition of an azomethine in addition to the amine will improve the ability of these high performance gear oil blends to pass severe gear tests of the type required for military approval. At the same time the amine-azomethine blend imparts quiet performance to these high performance gear oils when used in slip-lock differentials.

In brief compass, the slip-lock differential lubricants of this invention will comprise a major proportion of a gear oil compounded from a lubricating or base oil having a viscosity of about 50 to 220 SUS at 210° F., an extreme pressure additive, and in the range of 0.2 to 2.0 wt. percent of a primary $C_{12}$ to $C_{24}$ alkyl amine. The slip-lock differential lubricants designed for extremely severe operating conditions (high speed, high torque or severe shock) will comprise in the range of 0.15 to 1.5 wt. percent of a $C_{12}$ to $C_{24}$ aliphatic azomethine in addition to the above ingredients, the ratio of amine to azomethine being about 0.25 to 4.0.

The amine additives of this invention include primary alkyl amines, wherein the alkyl group is a branched or straight chain alkyl group of a $C_{12}$ to $C_{24}$ hydrocarbon. A mixture of primary alkyl amines may also be used, such as the primary alkyl amines made from hydrogenated tallow. Examples of operable amines are octadecyl, hexadecyl, octadecenyl and dodecyl amines. The primary alkyl amines of 12 to 24 carbon atoms are preferred, and mixtures of the primary alkyl amines made from hydrogenated tallow are particularly preferred.

The azomethine additive is prepared by reacting formaldehyde with an aliphatic amine and has the following generic formula:

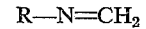

wherein R represents an alkyl or alkenyl group of 12–24 carbon atoms and preferably 14–16 carbon atoms. Particularly preferred are the azomethines, wherein R is a tertiary alkyl group of 14–16 carbon atoms. The preferred species of R is derived from propylene polymer. The reaction between the alkyl amine and formaldehyde is shown in the following equation:

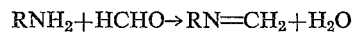

Suitable azomethines have a carbon to hydrogen ratio of about 5:6, a nitrogen content between 5.5 and 7% by weight and carbon content between 75 and 85% by weight by ultimate analysis.

The base oil used to form the gear lubricants of this invention may be either a mineral or a synthetic lubricating oil, the former being preferred. These lubricating oils will have a viscosity in the range of 50 to 220 SUS at 210° F. and a viscosity index in the range of −20 to +150, preferably in the range of 60 to 100.

The gear oil for use in accordance with this invention may contain conventional additives, such as viscosity index improvers anti-oxidants or corrosion inhibitors, and normally contains extreme pressure agents, such as chlorinated paraffins, lead soaps, zinc dialkyl dithiophosphate, sulfurized oils, etc. Extreme pressure additives are well known in the lubricating art and are normally used in hypoid gear lubricants. The increased rear wheel torque of new passenger cars and commercial vehicles has caused a corresponding increase in the loading on the hypoid gears and has necessitated the use of lubricants containing extreme pressure agents.

The additives of this invention may be prepared in concentrated form. For example, about 2 to 20 wt. percent of the amine or 2 to 20 wt. percent of the amine and 1.5 to 15 wt. percent of the aliphatic azomethine may be added to a gear oil base to form the concentrate.

In general, the compositions of this invention will be prepared by simply adding the amine or the amine and azomethine to the gear oil base.

The invention will be further understood by the following examples which include the preferred embodiments of the invention.

EXAMPLE I

To show that certain amines or amine derivatives substantially reduce or eliminate those noises which frequently occur in slip-lock differentials, a mineral lubricating oil (base oil) and three different gear oils were tested with and without the amine additives in different make automobiles equipped with slip-lock differentials. A conventionally lubricated slip-lock differential produces frequent and extremely annoying chattering sounds during normal operation, however, for test purposes the most severe conditions are used so that the noise is at its worst level. Thus, changes in noise level may be apparent. Data in Tables I and III which follow were obtained under the most severe conditions. Data in Table II are representative of a variety of relatively severe conditions to show graduations of performance.

The oils used in the following tests were:

*Base Oil.*—A mineral lubricating oil having a viscosity at 210° F. of about 94 SUS and a viscosity index of 90 consisting of a blend of (1) dewaxed, deasphalted residuum having nominal viscosity at 210° F. of 210 SUS and (2) dewaxed, phenol extracted clay-contacted distillate of nominal viscosity at 100° F. of 250 SUS, each component being derived from Mid-Continent crude.

*Gear Oil A.*—A base hypoid gear lubricating oil composition prepared by mixing 6.4 wt. percent of a sulfur-chlorinated paraffin and 5.2 wt. percent of a zinc dihexyl dithiophosphate (the hexyl groups were derived from methyl isobutyl carbinol) in 88.4 wt. percent of a mineral lubricating oil having a V.I. of 90 and a viscosity at 100° F. of 1094 SUS. The sulfur chlorinated paraffin was prepared according to U.S. 2,124,598 and contained 30 wt. percent chlorine and 6 wt. percent sulfur. The zinc dihexyl dithiophosphate used above was prepared according to U.S. 2,369,632.

*Gear Oil B.*—A hypoid gear lubricating oil composition consisting of 10 wt. percent of the sulfur-chlorinated paraffin of Gear Oil A in the above Base Oil (Viscosity Index of 90 and a viscosity at 210° F. of 94 SUS).

*Gear Oil C.*—A hypoid gear lubricating oil consisting of 3.05 wt. percent of the sulfur-chlorinated paraffin of Gear Oil A and 2.48 wt. percent of the zinc dihexyl dithiophosphate of Gear Oil A in the above Base Oil (Viscosity Index of 90 and a viscosity at 210° F. of 94 SUS).

Table I which follows shows, first, that slip-lock differentials are noisy with, (1) base oils (Run 1), (2) conventional sulfur-chlorinated type gear oils (Gear Oil B, Run 3, and (3) with MIL–L–2105 type oils (Gear Oil A, Run 7); second, that certain conventional lubricity or oiliness agents do not improve performance (Runs 4, 5, 8, 9, 10 and 11); third, that Amine T (a mixture of primary alkyl amines consisting of 30% hexadecyl amine and 70% octadecyl amine) gives marked reduction or complete elimination of noise (Runs 2, 6, 12 and 13); and, fourth, that a mixture of Amine T and Azomethine J (a $C_{16}$ alkyl azomethine) is also effective in markedly reducing noise (Run 14).

The road tests of Table I were conducted by executing tight circles at speeds of from about 2 to 10 miles per hour with braking during the course of the turn.

Table I

| Runs | Additive, wt. percent | Gear Oil | Noise on sharp turn with braking | | |
|---|---|---|---|---|---|
| | | | '58 Chrysler | '58 DeSoto | '58 Pontiac |
| 1 | None | Base oil | Severe | | Severe. |
| 2 | 1% wt. Amine T | do | None | | Do. |
| 3 | None | B | | | Do. |
| 4 | 0.25 wt. percent TCP | B | | | Do. |
| 5 | 0.5 wt. percent TCP | B | | | Do. |
| 6 | 0.5 wt. percent Amine T | B | | | None. |
| 7 | None | A | | Severe | |
| 8 | 25 wt. percent sulfurized Sperm oil | A | | do | |
| 9 | 0.5 wt. percent castor oil | A | | do | |
| 10 | 0.25 wt. percent dimerized linoleic acid. | A | | do | |
| 11 | 0.5 wt. percent TCP | A | | do | |
| 12 | 1.0 wt. percent Amine T | A | | None | |
| 13 | 0.5 wt. percent Amine T | A | Very light | | |
| 14 | 0.33 Amine T plus 0.14 Azomethine J. | C | Trace | | |

Table II shows that other amines and amine salts also give a definite improvement in the noise level. Results indicate that oils formulated with these other additives would be satisfactory in all but the most critical cars on the road under normal operating conditions. The table also shows that the primary alkyl amines are preferred.

Table II

[All tests were made in the same 1958 Chrysler within a one week period. Each oil was used for at least 7 miles before start of testing]

| Auxiliary additive, wt. percent | Gear Oil | Slip-lock noise rating | | | | |
|---|---|---|---|---|---|---|
| | | Left circles | | | Right circles | |
| | | Deceleration | | Slow drag | Heavy deceleration | Slow drag |
| | | Medium | Heavy | | | |
| None | A | Severe | Severe | Severe | Moderate | Moderate. |
| Amine T | A | | Very light | | | |
| Amine S [1] | A | Severe | Severe | Light | | Trace. |
| Amine salt D [2] | A | do | do | do | | Do. |

[1] Soya dimethyl amine, i.e. a tertiary amine $RN(CH_3)_2$.
[2] Dioleate of N-tallow propylene diamine.

Table III shows the ability of various amine additives in varied concentrations to suppress slip-lock chattering. The table also shows that while azomethine by itself is not effective in preventing noise in slip-lock differentials, it performs satisfactorily when combined with primary alkyl amines. Further, the table establishes that amines and particularly primary amines in concentrations above 0.3 wt. percent based on the weight of the gear oil blend, either alone or in combination with alkyl azomethines will substantially reduce chattering in slip-lock differentials. The tests are particularly designed to determine the ability of the additive to suppress the chattering noises which occur on sharp turns at speeds of about 5 to 15 miles per hour. Partial engagement of the clutch plates on the axle of the outside wheel (relative to the turn) occurs under these conditions.

EXAMPLE II

As pointed out in the specification amine containing gear oil blends are not quite as good in extreme pressure properties as the original gear oil. That is, addition of a primary amine causes a slight increase in wear as do other amines and amine derivatives. However, azomethine reduces wear and when added to amine/gear oil blends imparts a wear resistance superior to that of the gear oil without amine despite the adverse effect, as regards wear, of the amine when used alone in the gear oil.

Table IV shows that the amines of Table II when added to high performance MIL-L-2105 type gear oils, will reduce the extreme pressure properties of said gear oils. The table further shows, however, that if an alkyl azomethine or a combination of an alkyl azomethine and an amine are added to the same gear oil the extreme pressure properties, instead of being decreased, will actually be improved.

Table IV represents the results obtained in a modified SAE test. The base lubricant for this test was a hypoid gear oil, hereinafter designated Gear Oil D, which is the same as Gear Oil A except that 6.9 wt. percent of the sulfur-chlorinated paraffin and 5.7 wt. percent of the zinc dihexyl dithiophosphate were added to the base oil. The extreme pressure properties of Gear Oil D were tested alone and with different additives by means of an SAE Extreme Pressure Testing Machine (CRC designation, L-17-545). See Coordinating Research Councils Handbook, 1946; copyright 1946, by Coordinating Research Council, Inc., and published by J. J. Little and Ives Company, New York. In brief, this test consisted of rotating two cylindrical test specimens in line contact with each other and in opposite directions with pressure applied at the line contact between the rotating cylinders. A 55-pound load was applied for a 15-minute break-in period, followed by increasing the load to 110 pounds and rotating the test cylinders for one hour at 225° F. The shaft was operated at 500 r.p.m. with a gear ratio of 3.4 to 1 between the test cylinders and the shaft. The weight loss, in milligrams, of the test cylinders was then measured.

Table IV
MODIFIED SAE TEST

[15-minute break-in with 55-pound load, plus 1 hour at 225° F. with 100-pound load]

| Additive | Wt. Percent in Gear Oil D | Wt. loss of rings, mg. | |
|---|---|---|---|
| | | Top | Bottom |
| None | 0 | 63 | 15 |
| Amine T | 0.5 | (1) | (1) |
| Amine D [2] | 1.0 | 253 | 27 |
| Dioleate of Amine D [3] | 1.0 | 102 | 84 |
| Oleic acid | 0.25 | 123 | 34 |
| Dimer of linoleic acid | 0.25 | 154 | 20 |
| Azomethine J | 0.5 | 10 | 10 |
| Amine T and Azomethine J | 0.5 / 0.5 | 11 | 12 |
| Amine T and Azomethine J | 0.7 / 0.3 | 18 | 20 |

[1] Sparks, heavy scoring.
[2] Amine D is an N-alkyl propylene diamine wherein the alkyl group is composed of a mixture of $C_{10}$ to $C_{18}$ alkyl groups and a $C_{18}$ mono-unsaturated chain (sold commercially as Duomeen T).
[3] Same as Amine Salt D of Table II (dioleate of N-tallow propylene diamine).

Table III
SLIP-LOCK DIFFERENTIAL NOISE TESTS

| Additive | Gear Oil | Wt. percent in gear oil | Noise on Left Circles with Braking | | | |
|---|---|---|---|---|---|---|
| | | | '58 DeSoto | '58 Chrysler | '58 Chev. | '58 Olds. |
| None | | | Severe | Severe | Severe | Severe. |
| Amine salt D | A | 0.5 | Very light | | | |
| Amine T | A | 1.0 | None | | | |
| Do | A | 0.1 | | Severe | | |
| Do | A | 0.3 | | do | | |
| Do | A | 0.5 | | Very light | | Moderate. |
| Azomethine J | A | 1.0 | Severe | | | |
| Amine T and Azomethine J | A | 0.5 / 0.25 | | Very light | | |
| Amine T and Azomethine J | A | 0.7 / 0.3 | | | None | None. |
| Amine T and Azomethine J | C | 0.33 / 0.14 | | Trace | | |

To confirm the laboratory data of Table IV full-scale gear tests were conducted on Gear Oil A alone and on Gear Oil A containing those additives which successfully prevented chattering noises in the road tests of Tables I, II and III above.

The full-scale gear tests consisted of:

(1) *CRC–L–37–756 high speed-high torque test.*—The CRC–L–37–756 test was developed for the Ordnance Department and is titled "Research Technique for Determining Load-Carrying, Wear, and Extreme Pressure Characteristics of Universal Gear Lubricants in Axles Under Conditions of High-Speed, Low-Torque Operation, Followed by Low-Speed, High-Torque Operation." Briefly described, this test is carried out as follows:

The test unit consists of a new ¾-ton army truck hypoid rear axle carrier, 5.83:1 ratio, installed in its own housing. The unit is driven by a six-cylinder 235 cu. in. Chevrolet truck engine with standard ignition and carburetor, with suitable transmission, couplings, and dynamometer parts.

Sequence 1 of the test consists of 100 minutes operation at a ring gear speed of 440 ±5 r.p.m. and a ring gear torque of 9460 ±150 inch-pound. The gear oil temperature is 300° F. maximum.

Sequence 2 of the test consists of 24 hours operation at a ring gear speed of 80 ±1 r.p.m. and a ring gear torque of 41,800 ±150 inch-pound. The oil temperature is 275° F. ±3° F.

After completion of the above test, the ring and pinion gears are examined for evidence of surface distress and wear. The results of the above tests are shown in Table V which follows.

(2) *Buick 10–A road test.*—The Buick 10–A test is an actual road test and consists of 10 high-speed cycles of driving from 60 to 109 m.p.h., 3 shock cycles at 50 to 35 m.p.h., 60 to 45 m.p.h., and 70 to 55 m.p.h., respectively, followed by 10 more high speed cycles of 60 to 109 m.p.h. The high speed cycles were carried out by rapidly accelerating from 60 to 109 m.p.h., then allowing the auto to coast until the speed was back to 60 m.p.h., then the cycle was repeated. The shock cycles were carried out by allowing the auto to coast from the higher speed until the lower speed was reached and then shifting into low gear. Upon completion of test, the differential was disassembled and the ring and pinion gears examined for scoring.

*Table V*

FULL-SCALE GEAR TESTS

| Test oils, additives, wt. percent in Gear Oil A | CRC-L-37 test, high-speed, high-torque | Buick 10-A road shock test, percent score |
|---|---|---|
| None | Very light ridging | 5-10 (interpolated). |
| 0.5 Amine T | Fail, light ridging | Pass, 5. |
| 0.5 Amine T+0.25 tricresyl phosphate. | Fail, medium ridging | Borderline, 10. |
| 0.7 Amine T plus 0.3 Azomethine J. | Pass | |
| 0.5 Amine T plus 0.25 Azomethine J. | | Pass, 3. |
| 0.5 Amine T plus 0.5 dioctyl acid phosphate. | Fail, light-medium ridging. | |

The above table shows that only the additive of the present invention (i.e., the combination of a primary amine with an alkyl azomethine), when added to gear oils, will both suppress the noise characteristic of sliplock differentials and impart extreme pressure properties to the gear oil.

EXAMPLE III

It has also been found that the primary alkyl amines and the amine-azomethine additives of this invention are effective in improving the high temperature stability of gear oils. To illustrate this property samples of gear oil A containing (1) no additive, and (2) T and Azomethine J, were heated for 100 hours at 250° F. in the presence of air. Upon cooling, the percent viscosity increase at 210° F. and the sludge as percent sediment insoluble in heptane were determined. The results are shown in Table VI.

*Table VI*

GEAR OIL OXIDATION TESTS

[100 hrs. at 250° F.]

| Additive, wt. percent | Gear oil | Percent vis. increase at 210° F. | Percent heptane insoluble sediment |
|---|---|---|---|
| None | A | 9.2 | 2.6 |
| Amine T, 0.6 plus Azomethine, 0.24. | A | 4.3 | 0 |

It is evident that the additives of this invention, when used in total concentrations of 0.75 to 1.0% in Gear Oil A, are effective not only in controlling the increase in viscosity but also in preventing the formation of sediment upon oxidation.

In summary, Examples I–III show that addition of minor amounts of an amine will suppress the noise in sliplock differentials, reduce sludge formation on storage, and when combined with an azomethine will improve the extreme pressure properties of the lubricant.

Use of the additive and additive combination of this invention should not be limited to the above examples.

What is claimed is:

A method for reducing chatter in a limited slip differential gear assembly which comprises lubricating the assembly with a gear lubricant consisting essentially of a base mineral oil of lubricating viscosity, about 5 to 20 percent by weight of total extreme pressure agent and 0.2 to 1.0 percent by weight of primary $C_{12}$ to $C_{24}$ alkyl amine.

References Cited by the Examiner

UNITED STATES PATENTS

| 1,594,983 | 8/26 | Somerville | 252—50 |
| 1,888,023 | 11/32 | Adams | 252—50 X |
| 2,268,608 | 1/42 | McNulty et al. | 252—47.5 X |
| 2,366,013 | 12/44 | Duncan | 252—47 X |
| 2,696,473 | 12/54 | Sokol | 252—47.5 X |
| 2,758,086 | 7/56 | Stuart et al. | 252—50 X |

FOREIGN PATENTS 757,219    9/56    Great Britain.

DANIEL E. WYMAN, *Primary Examiner.*

JULIUS GREENWALD, JOSEPH R. LIBERMAN,
*Examiners.*